United States Patent [19]

Duffy et al.

[11] Patent Number: 4,754,778
[45] Date of Patent: Jul. 5, 1988

[54] VELOCITY BOOST BODY WITH WRAP-AROUND PITOT TUBE

[75] Inventors: John W. Duffy, Tama; Dennis G. Sickels, Marshalltown, both of Iowa

[73] Assignee: Fisher Controls International, Inc.

[21] Appl. No.: 54,371

[22] Filed: May 26, 1987

[51] Int. Cl.⁴ ............................................ G05D 16/02
[52] U.S. Cl. ............................ 137/484.8; 137/505.36; 137/505.46
[58] Field of Search ............... 137/484.2, 484.4, 484.6, 137/484.8, 505.46, 505.36, 116.5, 513.3; 251/55, 51

[56] References Cited

U.S. PATENT DOCUMENTS

| | | | |
|---|---|---|---|
| 2,011,764 | 8/1935 | Hughes | 137/484.4 |
| 2,318,962 | 5/1943 | Parker | 137/513.3 |
| 2,826,213 | 3/1958 | Wright | 137/484.4 X |
| 2,827,069 | 3/1958 | Peterson | 137/505.46 X |
| 3,545,465 | 12/1970 | Zadoo | 137/484.8 X |
| 3,575,203 | 4/1971 | Johnson | 137/484.8 |

Primary Examiner—Martin P. Schwadron
Assistant Examiner—Stephen M. Hepperle
Attorney, Agent, or Firm—Nicholas A. Camasto; Dale A. Kubly

[57] ABSTRACT

A pressure relief diaphragm type regulator valve includes a velocity boost body having an annular-shaped wrap-around pitot tube communicating with the vena contracta of a flowpath. The pressure at the vena contracta is communicated to the diaphragm by a small registration orifice in the boost body. The boost body defines a large relief orifice open to the annular pitot tube, but normally closed off from the diaphragm by a flapper. Under a rapid excess pressure condition, the flapper uncovers the relief orifice and large volume flow is permitted to the diaphragm.

5 Claims, 3 Drawing Sheets

VELOCITY BOOST BODY WITH WRAP-AROUND PITOT TUBE

CROSS REFERENCE TO RELATED APPLICATIONS

This application discloses apparatus described in copending U.S. application Ser. No. 054,297, filed 5/26/87, entitled Travel Stop For Diaphragm Regulator Valve, in the name of John Duffy and Gregory Nichols, which application is assigned to Fisher Controls International, Inc. and incorporated by reference herein.

BACKGROUND OF THE INVENTION AND PRIOR ART

This invention relates generally to gas pressure diaphragm regulator valves and particularly to gas pressure diaphragm regulator valves that include pressure relief mechanisms.

Gas pressure regulator valves are well known in the art. In such valves, a valve disc and a mating seat assembly are positioned intermediate an upstream and a downstream portion of a flowpath for controlling downstream pressure and flow by varying the valve opening, that is, the amount by which the valve disc is displaced from its valve seat. Pressure and flow regulation are achieved by modulating the valve opening to develop the downstream pressure required to deliver the flow demanded by the load. A popular form of regulating valve includes a diaphragm that acts as both a measuring and a loading device with the downstream pressure being applied to one side of the diaphragm against the forces of an opposed adjustable spring. The upstream pressure applies an opening force against the valve disc, which force is applied through a stem and linkage mechanism to a pusher post that is in communication with the diaphragm and the regulator spring. The downstream pressure applies an opposing force, i.e., one that tends to close the valve, to the diaphragm itself. The linkage mechanism has a mechanical disadvantage that enables the downstream pressure to offset the force of the regulator spring, thereby enabling regulation.

Valves of this type often incorporate a pitot tube for applying the pressure at the vena contracta, to the diaphragm. At the vena contracta, which is generally located a short distance downstream of the actual valve opening, the flow velocity is at a peak and the pressure is at a minimum. As those skilled in the art recognize, the so-called "droop", that is the drop in downstream pressure that occurs with increased load flow, may be offset by a number of techniques. In regulator valves with proportional control, droop is always present. The technique of velocity boosting is therefore frequently used, since it is simple, inexpensive and relatively effective. Velocity boosting essentially applies the lower pressure at the vena contracta, by means of a pitot tube, to the diaphragm rather than the higher controlled pressure downstream, with well-known improvements in operating characteristics of the regulator.

In a pipeline installation, there is always the possibility of a sudden increase in pressure that can pose significant problems for the regulating mechanisms coupled to the line. In a pressure relief diaphragm type regulator, means are provided for applying an increased pressure to the diaphragm to cause rapid closure of the valve orifice and protect the load equipment connected to the downstream side. While in many installations the regulating valves are not "pressure relieved", and some other mechanism is placed in the pipeline to protect against abnormal pressure increases, the present invention is only concerned with pressure relief type diaphragm valves. Under an excess pressure condition, the regulating valve can be damaged or even destroyed by the abnormally large force applied to the diaphragm. As discussed in copending application Ser. No. 054,297, even in a pressure relief type diaphragm regulator the linkage may be stressed to the point of damage or destruction. Although the pusher post, retainer and pressure relief indicator of that invention are disclosed herein, they form no part of the present invention.

In a pressure relief type diaphragm regulator valve, provision must be made for rapidly enabling a large increase in downstream pressure to be communicated to the diaphragm to quickly close the valve. In a regulator valve utilizing velocity boosting, the long narrow pitot tube and the small registration orifice pose a significant impediment to pressure relief operation since the size of the passageway communicating between the downstream side of the casting body, where the valve is located, and the lower chamber, where the diaphragm is located, is quite small. Consequently, it is difficult, if not impossible, to apply the high pressure to the diaphragm rapidly enough to effectuate valve closing to protect downstream loads connected to the pipeline.

With the present invention, a velocity boost body with a wrap-around pitot tube is provided for sampling the pressure at the vena contracta through a small registration orifice. The boost body is configured to enable a large passageway to be established between the downstream side of the body casting and the diaphragm under an excess pressure condition.

OBJECTS OF THE INVENTION

A principal object of the invention is to provide an improved diaphragm regulator valve employing a pitot tube.

Another object of the invention is to provide a pressure relieved diaphragm regulator valve that has a pitot tube.

A further object of the invention is to provide an improved pressure relief diaphragm regulator valve.

BRIEF DESCRIPTION OF THE DRAWINGS

Further objects and advantages of the invention will be apparent upon reading the following description in conjunction with the drawings in which.

DESCRIPTION OF THE PREFERRED EMBODIMENT

Figure 1:
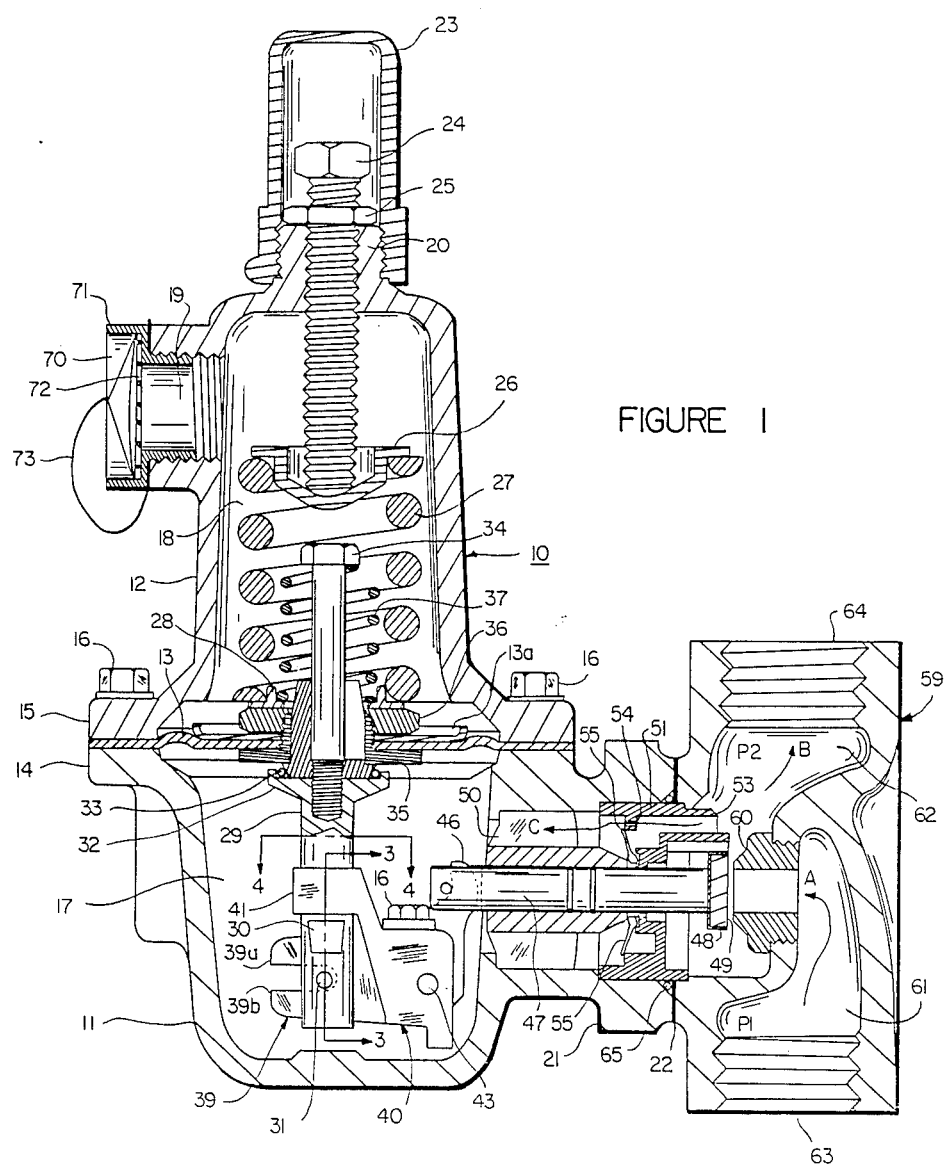
FIG. 1 is a sectional view of a diaphragm type pressure relief regulator valve constructed in accordance with the invention.

Referring to FIG. 1, a regulator valve 10 includes a lower casing 11 and an upper spring casing 12 that are separated by a generally flat, circular elastomeric diaphragm 13. The valve casings are preferably cast of metal and machined where required. The diaphragm is maintained in position between casings 11 and 12 by means of flanges 14 and 15 and bolts 16. This arrangement provides a lower chamber 17, formed by the underside of the diaphragm and lower casing 11, and an upper chamber 18, formed by the upper side of the diaphragm and spring casing 12.

An interiorly threaded vent 19 and an interiorly and exteriorly threaded post 20 are formed in the upper part of spring casing 12. Lower casing 17 extends into a flange 21, at right angles to flanges 14 and 15, that forms a seal edge 22 for engagement with a body casting 59. Body casting 59 supports a valve seat therein and in coordination with the lower casing 17 supports a valve disc, the velocity boost body of the invention and an operating stem for the valve disc. Body casting 59 also includes suitable end means for connecting the regulator valve in a pipeline.

An elongated cup-shaped cap 23 is closed at one end and includes thread means for threadingly engaging the exterior threads of post 20 to provide access for adjustment of the regulator mechanism. Cap 23 is removable to permit regulator adjustments and may include suitable gasket means for making a relatively pressure tight seal when the cap is in position. An adjusting screw 24 threadingly engages the interior threads of post 20 and is secured in its adjusted position by means of a locknut 25 engaging the outer flat surface of post 20. One end of adjusting screw 24 forms a head to facilitate rotation of the screw by means of a suitable tool and the other end bears against an inverted, dome-shaped, upper spring seat 26. Spring seat 26 bears against the ground end of a compression spring 27, the other ground end of which engages a lower spring seat 28. Compression spring 27 functions to provide an adjustable closing force to the valve disc for controlling downstream flow conditions in a well known manner. As will be described, diaphragm 13 is positioned between lower spring seat 28 and the enlarged upper surface of a cylindrically shaped pusher post 29.

Figure 2:
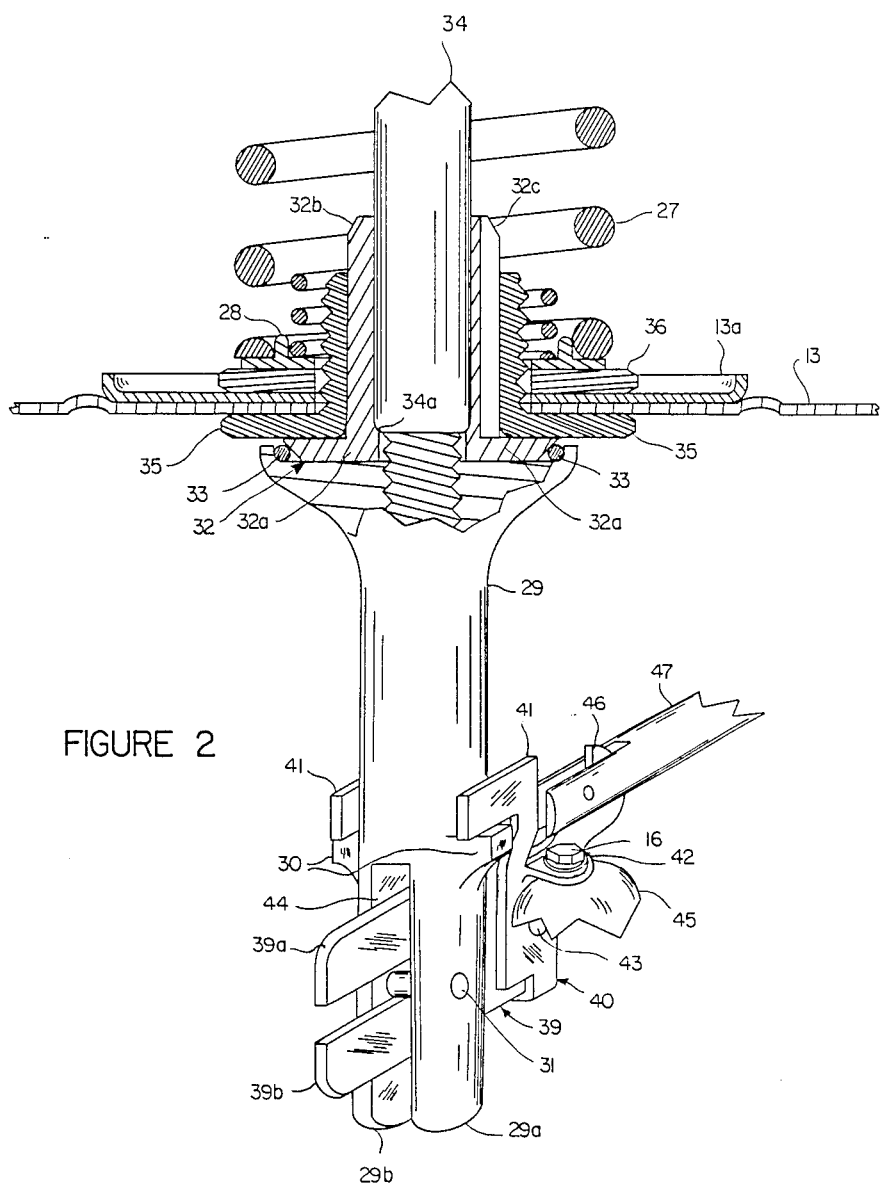
FIG. 2 is a partial perspective view showing the relief mechanism, pusher post, lever and retainer of the valve of FIG. 1.
Figure 5:
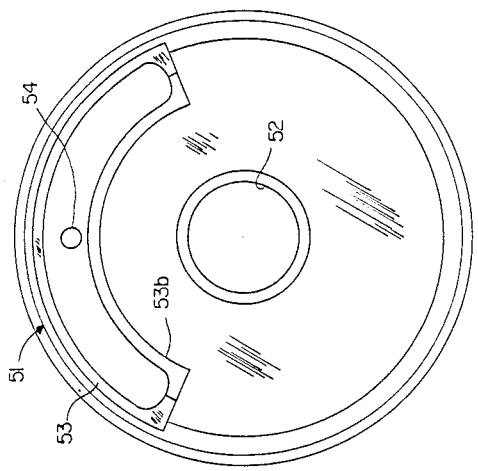
FIG. 5 is a front elevation of the velocity boost body.
Figure 4:
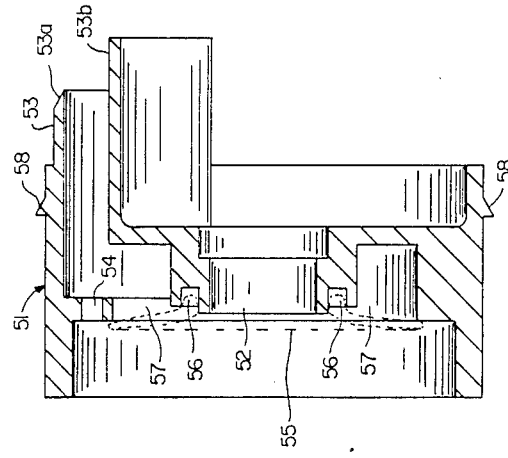
FIG. 4 is a sectional view of the velocity boost body taken along lines 4—4 of FIG. 3.
Figure 6:
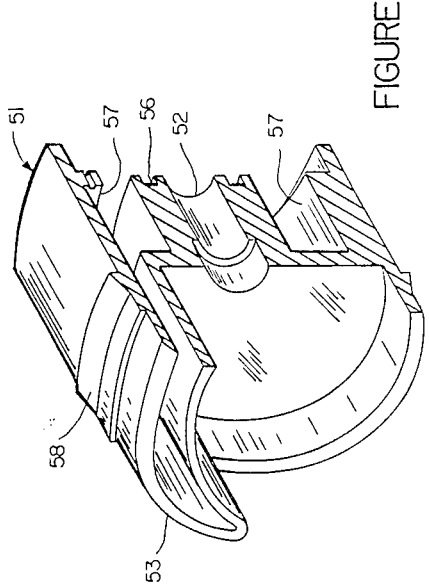
FIG. 6 is a cut away perspective of the velocity boost body.
Figure 3:
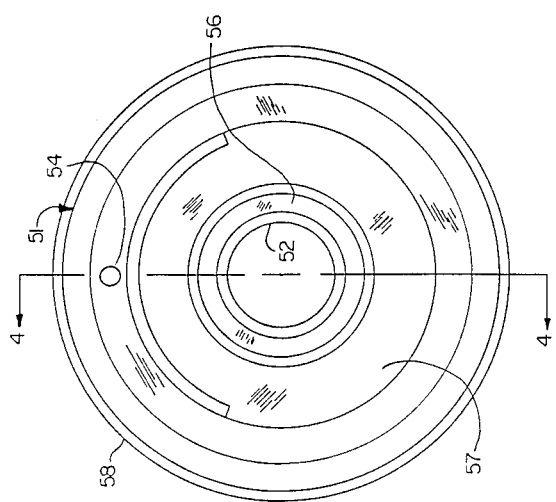
FIG. 3 is a rear elevation of the velocity boost body of the invention.

As best seen in FIG. 2, the lower end of pusher post 29 is bifurcated to form a pair of legs 29a and 29b and includes a pair of outwardly extending, integrally formed stop ears 30. A horizontally disposed drive pin 31 bridges legs 29a and 29b at an intermediate point and, as will be seen, is engaged by the legs of a lever for coupling forces between the valve disc and the pusher post. As will be seen, pusher post 29 comprises movement means for conveying movement of the diaphragm to the valve disc.

A three-legged guide 32 has a circular portion 32a that rests against the top of pusher post 29; and legs 32b, 32c and 32d (the latter not visible in the drawings) having surfaces that lie on inner and outer cylindrical surfaces. A cap-shaped connector 35 and a mating nut 36 are threadingly engaged to clamp the central portion of diaphragm 13 and a rigid diaphragm head 13a therebetween. The lower portion of spring seat 28 abuts nut 36. Connector 35, nut 36, diaphragm 13 and diaphragm head 13a are axially movable, as a unit, up and down along the outer cylindrical surface defined by the legs of guide 32 against the forces exerted on lower spring seat 28. In so doing, an O-ring 33, which is normally compressed between the top surface of pusher post 29 and the bottom surface of connector 35, breaks its seal to establish passageways from lower chamber 17 to spring chamber 18 through the spaces defined between the legs 32b, 32c and 32d of guide 32. A cylindrical guide retainer 34 is threaded at one end for centrally engaging the top of pusher post 29 and includes a shoulder 34a for securing guide 32 to pusher post 29. Retainer 34 also includes a head (FIG. 1) that engages an appropriately formed end of a locking spring 37 that is also seated against lower spring seat 28. Locking spring 37 prevents vibration from loosening guide retainer 34. Thus the entire diaphragm assembly urges pusher post 29 in a downward direction due to the force exerted by regulator spring 27 and locking spring 37.

A flat, generally L-shaped, lever 39 includes a pair of legs 39a and 39b extending in the slot formed in pusher post 29 by legs 29a and 29b, and straddling pin 31. The lever is mounted for movement about a pin 43 that is supported in a retainer 40. Retainer 40 is firmly secured to a pair of support posts 45, formed in lower casing 11, by means of outwardly extending mounting brackets 42 and nuts 16. Retainer 40 also includes a pair of stops 41 which straddle pusher post 29 and extend over stop ears 30. The other end of lever 39 forms a cam 46 that is captured in a slot formed by a pin and a shoulder in a movable cylindrical stem 47 that is connected at its other end to a valve disc holder 48 which supports a valve disc 49. This arrangement translates axial movement of stem 47 into 90 degrees-displaced axial movement of pusher post 29 and vice versa.

Referring back to FIG. 1, stem guide 50 has a cruciform-shaped exterior and a cylindrical interior that is journalled to support cylindrical stem 47 for axial movement. The exterior configuration of the stem guide permits flow thereover as indicated by the arrow labelled C. A pair of circumferential grooves are formed in the stem and, in cooperation with a pair of O-rings, provide a pressure seal between stem 47 and stem guide 50. Lower casing 11 includes an annular lip for captivating stem guide 50 when a velocity boost body 51 is mounted in position. Boost body 51 includes a small registration orifice 54 to enable the pressure at the vena contracta in the flowpath to be communicated to lower chamber 17 and applied to the lower surface of diaphragm 13. Sampling is accomplished by means of a wrap-around pitot tube 53 of the invention that extends from velocity boost body 51 to an area adjacent to the downstream side of the valve disc 49. Velocity boost body 51 also includes an annular resilient flapper 55 that normally seals a large annular relief orifice formed in the boost body.

As mentioned, body casting 59 supports an annular valve seat 60. The body casting is partitioned into an upstream chamber 61 and a downstream chamber 62, with a suitable inlet fitting 63 and outlet fitting 64 for connection into a pipeline. Valve seat 60 and valve disc 49 separate the two chambers. An O-ring 65 is provided for making a pressure seal between body casting 59, seal edge 22 and boost body 51 when body casting 59 is bolted to lower casing 11 by means of conventional bolting (not shown). The arrows labelled A and B indicate the direction of flow in the flowpath, from pressure P1 to pressure P2, through valve seat 60.

A conically-shaped pressure relief indicator 70 is mounted in a cylindrical retainer 71 that is fittingly engaged, by any suitable means, in vent 19 of spring casing 12. A screen 72 is positioned in the opening of retainer 71 to keep foreign materials from entering spring casing 12. A strap 73 connects indicator 70 to spring casing 12 so that, in the event of a pressure relief operation dislodging indicator 70, the indicator will hang outside and serve as a "flag". Visual inspection will readily reveal that a pressure relief operation has occurred. Details of the construction and operation of indicator 70 are contained in copending application Ser. No. 054,297 and the indicator forms no part of the present invention.

Referring additionally to FIGS. 3, 4, 5 and 6, various views of a velocity boost body 51 with a wrap-around pitot tube 53 are shown. In general, body 51 is cylindrical in shape and defines a central orifice 52 through which stem 47 passes. A circumferential flange 58 is provided for making a sealing contact with O-ring 65 when the body casting is assembled to flange 21 of lower casing 11. The small registration orifice 54 provided at the rear of wrap-around pitot tube 53 enables communication of the pressure at the vena contracta to lower chamber 17. A large annular relief orifice 57 communicates with wrap-around pitot tube 53. This orifice is blocked by an annular-shaped resilient flapper 55 (shown in dashed lines in FIG. 4) which is captivated at its inner periphery in annular groove 56 by means of stem guide 50 (see FIG. 1). When flapper 55 is in its normal position, the only communication between the pitot tube and lower chamber 17 is through registration orifice 54. The forward end of pitot tube 53 is tapered as shown at upper portion 53a and does not extend as far forward as lower portion 53b This design, which covers approximately an arc of 120 degrees is significantly different from prior art pitot tubes that are generally narrow cylinders, and enables a large rapid volume flow, should the need arise. The annular shape and tapered configuration provides for minimum disruption of the flowpath while enabling sensing of the pressure at the vena contracta. Normal, i.e., gradual changes in pressure are accommodated by normal regulating action without deflection of flapper 55. In the event of a sudden increase in downstream pressure P2, the flapper 55 is deflected at its outer periphery to uncover relief orifice 57. Relief orifice 57, in conjunction with the wrap-around pitot tube, permits a large volume flow to quickly raise the pressure in lower casing 11. Thus, the increase in pressure is rapidly communicated to the underside of diaphragm 13 to enable a pressure relief operation, as will be explained. The velocity boost body may be of molded plastic construction.

In operation, adjusting screw 24 is rotated to establish the pressure exerted by regulating spring 27 against diaphragm 13 and pusher post 29. Through pin 31, legs 39a and 39b of lever 39 and stem 47, pusher post 29 exerts a force tending to close the valve, that is, force valve disc 49 into contact with valve seat 60. Under any given condition of flow, a pressure P1 exists in upper chamber 61 of the body casting. Movement of valve disc 49 away from valve seat 60, as indicated in FIG. 1, establishes a pressure P2 in downstream chamber 62. The pressure at the vena contracta, which is less than P2, is conveyed (arrow C) through registration orifice 54 in velocity boost body 51 to lower chamber 17 and acts against the lower surface of diaphragm 13. Because of the mechanical disadvantage of lever 39 and the relatively small surface area of valve disc 49 in comparison with the surface area of diaphragm 13, the pressure on the underside of the diaphragm is able to overcome the effect of the weight of the regulating mechanism and the forces exerted by regulating spring 27 and locking spring 37. Thus, for a given flow volume downstream, the pressure P2 can be stabilized by action of diaphragm 13, pusher post 29 and the linkage, which together adjust the opening between valve disc 49 and valve seat 60. This regulating action is well known in the art and forms no part of the present invention.

In the event of a rapid increase in downstream pressure P2 due, for example, to a large, rapid increase in upstream pressure P1, flapper 55 deflects, as mentioned, to greatly enlarge the passage between the downstream chamber 62 and lower casing 11. Thus the increased pressure is rapidly applied to the underside of diaphragm 13 and forces it in an upward direction, lifting pusher post 29 by means of the linkage and stem 47, and closes valve disc 49 tightly against valve seat 60 to protect the downstream side from the excessive pressure.

Diaphragm 13, however, may continue to move upward and when the pusher post is stopped, by the action of stops 41 on lever 39 and the stop ears 30 on the pusher post 29, springs 27 and 37 are compressed. In so doing, connector 35 breaks the seal formed by O-ring 33 and opens passageways formed by the separate guide legs 32b, 32c and 32d between lower casing 17 and spring casing 12. The pressure increase in spring casing 12 causes indicator 70 to "blow out" of retainer 71 and the pressure in spring casing 12 is relieved.

It will thus be apparent that with the wrap-around pitot tube of the present invention, the benefits of sampling the pressure at the vena contracta in the body casting is obtained without suffering the detriment of being unable to adequately provide internal pressure relief in the valve. The wrap-around pitot tube construction enables a large volume flow to occur in a very short time, as is required for pressure relief operations. Thus the wrap-around pitot tube of the invention enables the regulator valve to function with velocity boost while retaining an internal pressure relief capability.

What has been described is a novel velocity boost body arrangement for a diaphragm regulator valve. It is recognized that numerous changes in the described embodiment of the invention will be apparent to those skilled in the art without departing from its true spirit and scope. The invention is to be limited only as defined in the claims.

We claim:

1. In a pressure relief diaphragm type regulator valve including a first and a second casing and an elastomeric diaphragm separating said casings;
    movement means in said first casing operatively coupled to one side of said diaphragm for movement therewith;
    regulating means in said second casing for exerting pressure on the other side of said diaphragm;
    valve means for regulating flow in a flowpath, said valve means comprising a movable valve disc and linkage means coupling said valve disc to said movement means;
    a velocity boost body having a wrap-around pitot tube of large cross-sectional area forming the only passageway between said flowpath and said one side of said diaphragm and including a registration orifice for sensing the pressure at the vena contracta of said flowpath and applying said sensed pressure to said one side of said diaphragm; and relief means, communicating with said pitot tube near said registration orifice, for enabing large volume flow from said flowpath to said first casing in the event of an excessive pressure condition in said flowpath.

2. The valve of claim 1 wherein said relief means comprises a large relief orifice in said velocity boost body communicating with said wrap-around pitot tube and a flapper sealing said relief orifice for gradual pressure changes in said flowpath and uncovering said relief orifice for a rapid, abnormally high pressure change in said flowpath.

3. The valve of claim 2 wherein said wrap-around pitot tube is annular-shaped and extends over an arc of approximately 120 degrees.

4. A pressure relief diaphragm type regulator valve including an upper spring casing and a lower casing and an elastomeric diaphragm separating said casings;
- movement means in said lower casing engaging the lower side of said diaphragm;
- a regulating spring in said spring casing for exerting a force on the upper side of said diaphragm;
- a valve assembly for regulating flow in a flowpath, said assembly including a fixed valve seat and a movable valve disc;
- linkage means coupling said valve disc to said movement means;
- a velocity boost body including a large area wrap-around pitot tube communicating with the vena contracta of said valve assembly and including a small registration orifice for supplying the pressure at said vena contracta to said lower side of said diaphragm, said pitot tube providing the sole passageway between said flowpath and the lower side of said diaphragm;
- said velocity boost body further defining a large relief orifice in communication with said wrap-around pitot tube adjacent said registration orifice; and
- flapper means for closing off said relief orifice for normal pressure changes in the flowpath near said valve assembly, and for uncovering said relief orifice in the presence of a rapid excessive pressure change in said flowpath.

5. The valve of claim 4 wherein said wrap-around pitot tube is annular-shaped and extends over an arc of approximately 120 degrees.

* * * * *